L. Brumler,
Manf White Lead.
No. 113,014. Patented Mar. 28, 1871.
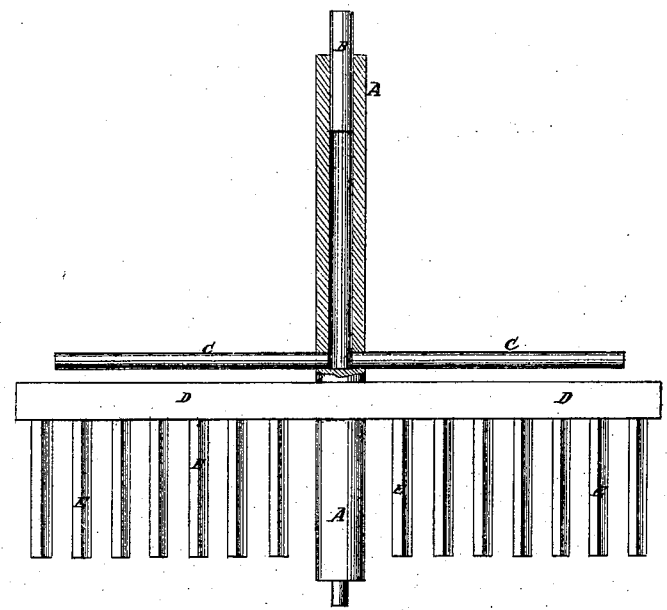
Witnesses:
A. W. Almquist
L. S. Mabee
Inventor:
L. Brumler
per
Mmm
Attorneys

United States Patent Office.

LUDWIG BRUMLEN, OF HOBOKEN, NEW JERSEY.

Letters Patent No. 113,014, dated March 28, 1871.

IMPROVEMENT IN THE MANUFACTURE OF WHITE LEAD.

The Schedule referred to in these Letters Patent and making part of the same.

*To all whom it may concern:*

Be it known that I, LUDWIG BRUMLEN, of Hoboken, in the county of Hudson and State of New Jersey, have invented a new and useful Improvement in the Manufacture of White Lead; and I do hereby declare that the following is a full, clear, and exact description thereof, which will enable others skilled in the art to make and use the same, reference being had to the accompanying drawing forming part of this specification.

The figure is a side view of my improved device, partly in section, to show the construction.

In the manufacture of white lead or the carbonate of lead from a basic solution of lead by precipitation by means of carbonic acid, it is essential for the production of the best quality of white lead that the carbonic acid should be introduced as nearly as possible in a uniform stream, and that the said stream should be divided as finely as possible into minute streams and transmitted through the whole volume of solution being operated upon.

My invention has for its object to effect a uniform and thorough distribution of the carbonic acid through the entire quantity of the solution being operated upon; and It consists in an improved mode of doing this, and in the device by which it is accomplished.

A large tank, the capacity of which is immaterial, is filled with the solution of lead. To a step or socket in the center of the bottom of the said tank is pivoted the lower end of an upright shaft, A, the upper end of which is supported in suitable bearings, and which is revolved by any convenient power.

The shaft A is perforated longitudinally, and into the upper end of said perforation is introduced an iron pipe, B, about which the said shaft revolves.

The pipe B is connected with an air-pump, by means of which the carbonic acid is forced through the shaft A, into the solution of lead, in a uniform stream.

With the lower part of the perforated shaft A are connected two or more cross-pipes, C, of copper or other suitable material, and perforated with numerous small holes, which pipes C, as they are carried around by and with the revolving shaft A, introduce the acid in minute streams through the entire mass of the solution.

Close below the pipes C is attached a cross-arm, D, equal in length to the interior diameter of the tank, and provided with pins or fingers, E, projecting downward, so as to just clear the bottom of the tank.

By this means the entire contents of the tank will be put into motion, thus bringing the acid in contact with every particle of said contents.

Having thus described my invention,

I claim as new and desire to secure by Letters Patent—

1. The revolving tubular perforated shaft A, perforated cross-pipes C, cross-arm D, and fingers E, combined, as described, with an air-pipe, B, for the purpose of distributing the carbonic acid in close contact with as many particles of the basic solution of lead as possible.

2. The process of applying to the basic solution of lead continuous fine streams of carbonic acid under the pressure of a current of air, as described.

The above specification of my invention signed by me this 2d day of August, 1870.

LUDWIG BRUMLEN.

Witnesses:
JAMES T. GRAHAM,
T. B. MOSHER.